No. 873,102. PATENTED DEC. 10, 1907.
W. W. SLY
CLUTCH.
APPLICATION FILED JUNE 21, 1907.
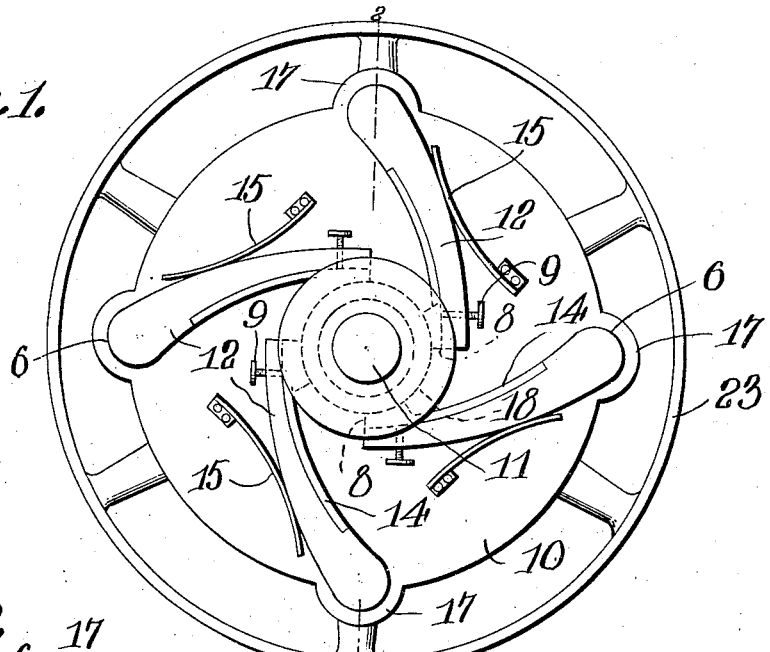
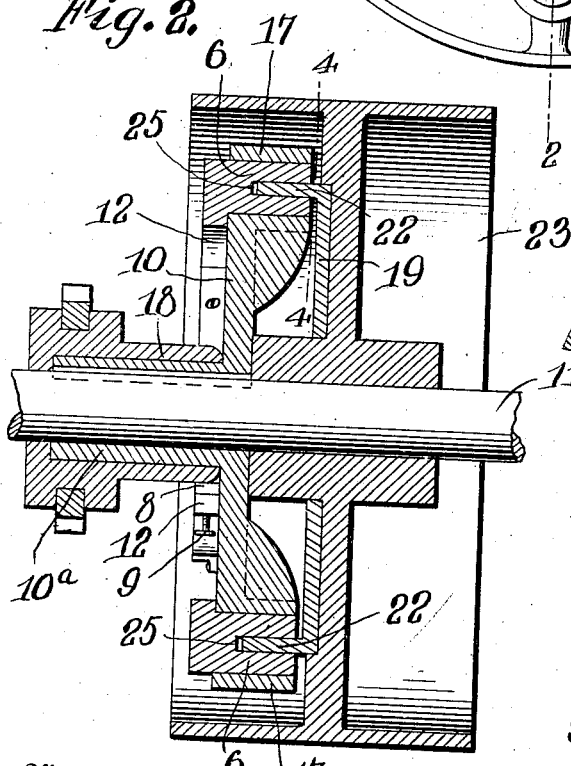
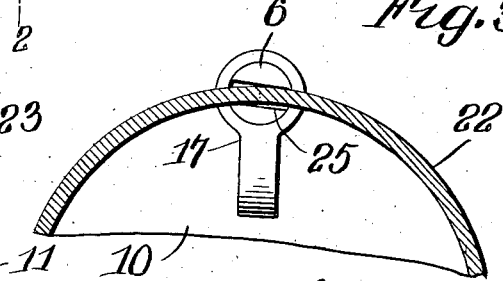
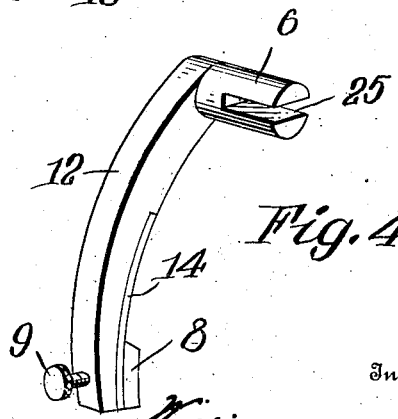
Witnesses
C. E. Smith
Geo. E. Tew
Inventor
William W. Sly
By Milo B. Stevens & Co.
Attorneys

UNITED STATES PATENT OFFICE.

WILLIAM W. SLY, OF CLEVELAND, OHIO.

CLUTCH.

No. 873,102.     Specification of Letters Patent.     Patented Dec. 10, 1907.

Application filed June 21, 1907. Serial No. 380,070.

*To all whom it may concern:*

Be it known that I, WILLIAM W. SLY, a citizen of the United States, residing at Cleveland, in the county of Cuyahoga and State of Ohio, have invented certain new and useful Improvements in Clutches, of which the following is a specification.

This invention relates to clutches, and has for its object to form a clutch with quick and powerful action, and requiring very little pressure or movement of the operating device or shifter to effect the desired action.

The invention is illustrated in the accompanying drawings, in which

Figure 1 is a side elevation of the clutch applied to a pulley. Fig. 2 is a section on the line 2—2 of Fig. 1. Fig. 3 is a perspective view of one of the clutching levers. Fig. 4 is a section on the line 4—4 of Fig. 2.

Referring specifically to the drawings, 23 indicates a pulley loose on the shaft 11. This pulley carries, or has formed integrally therewith, a circular disk 19 having an annular rim or flange 22 projecting outwardly at the edge thereof.

10 indicates a disk which is fast on the shaft and which is faced to the pulley. The disk carries a set of clutch levers indicated at 12. Four are shown but less or more may be used if desired. These levers have, at their outer ends, circular members or heads 6 which are mounted to turn in heavy or strengthened bearings 17 formed at the rim of the disk 10. The heads 6 are slotted as indicated at 25, to receive the rim 22, at a fit allowing relative motion, and the opposite side walls of the bearings 17 are also slotted, as shown in Fig. 3, to allow the passage of said rim.

The inner ends of the levers 12 are provided with shoes 8, which may be set up or adjusted by screws 9, and these shoes bear against the side of a shifting sleeve 18 which is operated by the usual shifting lever and slides lengthwise upon the hub 10ª of the disk 10. The end of the sleeve is beveled or conical and it is adapted to enter between the levers 12, or the shoes thereon, and to spread or turn said levers on the heads 6 as pivots. Springs 15, behind the levers, serve to prevent the operation thereof by centrifugal force, which otherwise might occur. The shoes 8 are connected to the levers by means of springs 14, which allow the adjustment referred to.

Normally, or when the clutch is disengaged, the disk 10 rotates with the rim 22 running free through the slots in the bearings 17 and the heads 6. To engage the clutch, the shifting sleeve is moved in to spread the levers or turn the same, which causes the heads 6 to grip the inner and outer surfaces of the rim 22 with a cam grip or bind, which clutches the parts and causes the pulley to rotate. The action is very quick and effective, and moderate pressure on the shifting lever will give a very tight bind, the leverage being greatly increased in consequence of the pivotal construction or arrangement of the heads 6.

Although the clutch is frictional, it is nevertheless very powerful, and may be utilized to drive heavy machinery or wherever great strain is to be supported, as well as on more delicate or lighter mechanisms. It may also be utilized to form a very efficient machine brake by reversal of its action.

1. The combination of a shaft, a rotative member thereon having an annular flange, a clutch lever supported on the shaft and having a pivot head with a slot therein through which the flange extends, and means to operate the lever to bind the flange in the slot.

2. The combination of a shaft, a rotative member thereon having an annular flange, a disk mounted on the shaft beside said member, clutch levers having heads pivoted in the disk, said heads having slots through which the flange extends, and means to operate the levers, to bind the flange in the heads.

3. The combination of a shaft having fast and loose rotative members thereon, one of said members having an annular flange and the other having pivot bearings opposite said flange, levers having pivots in said bearings, with gripping parts located on opposite sides of the flange, and means to operate the levers to turn the pivots and grip the flange.

4. The combination of a shaft, a wheel thereon having an annular flange, a disk on the shaft, having bearings the walls of which are slotted to allow the passage of the flange therethrough, levers having pivot heads in said bearings, slotted to extend on opposite sides of the flange, and means to operate the levers to grip the flange.

5. The combination of a shaft, a wheel thereon, a disk on the shaft adjacent the wheel, laterally swinging levers carried by the disk and at their outer ends having grip-devices to engage the wheel, and at their inner ends having adjustable shoes, and a sliding conical sleeve on the shaft, between the inner ends of the levers.

In testimony whereof I do affix my signature, in presence of two witnesses.

WILLIAM W. SLY.

Witnesses:
JOHN A. BOMMHARDT,
EDITH D. COMER.